Figure 1:
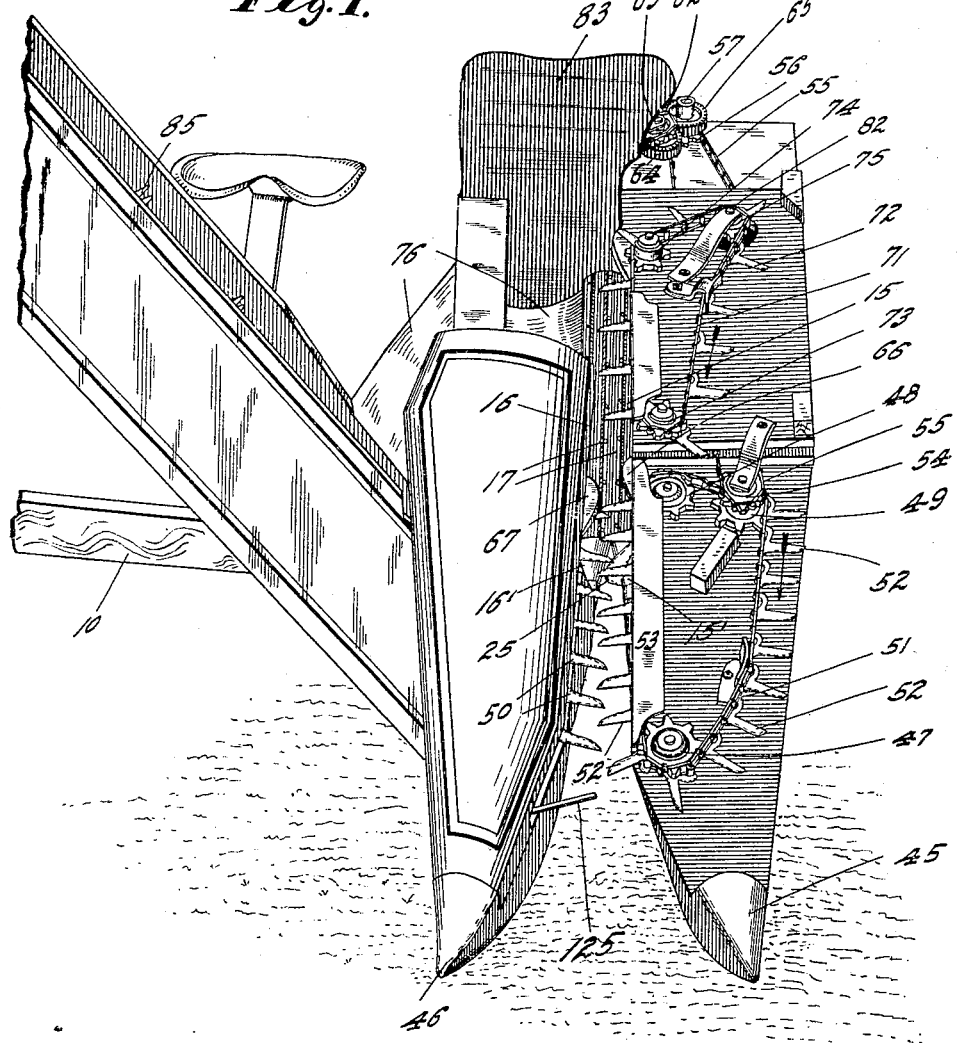

B. J. KAULL.
CORN PICKER.
APPLICATION FILED JUNE 1, 1909.

958,649.

Patented May 17, 1910.

3 SHEETS—SHEET 1.

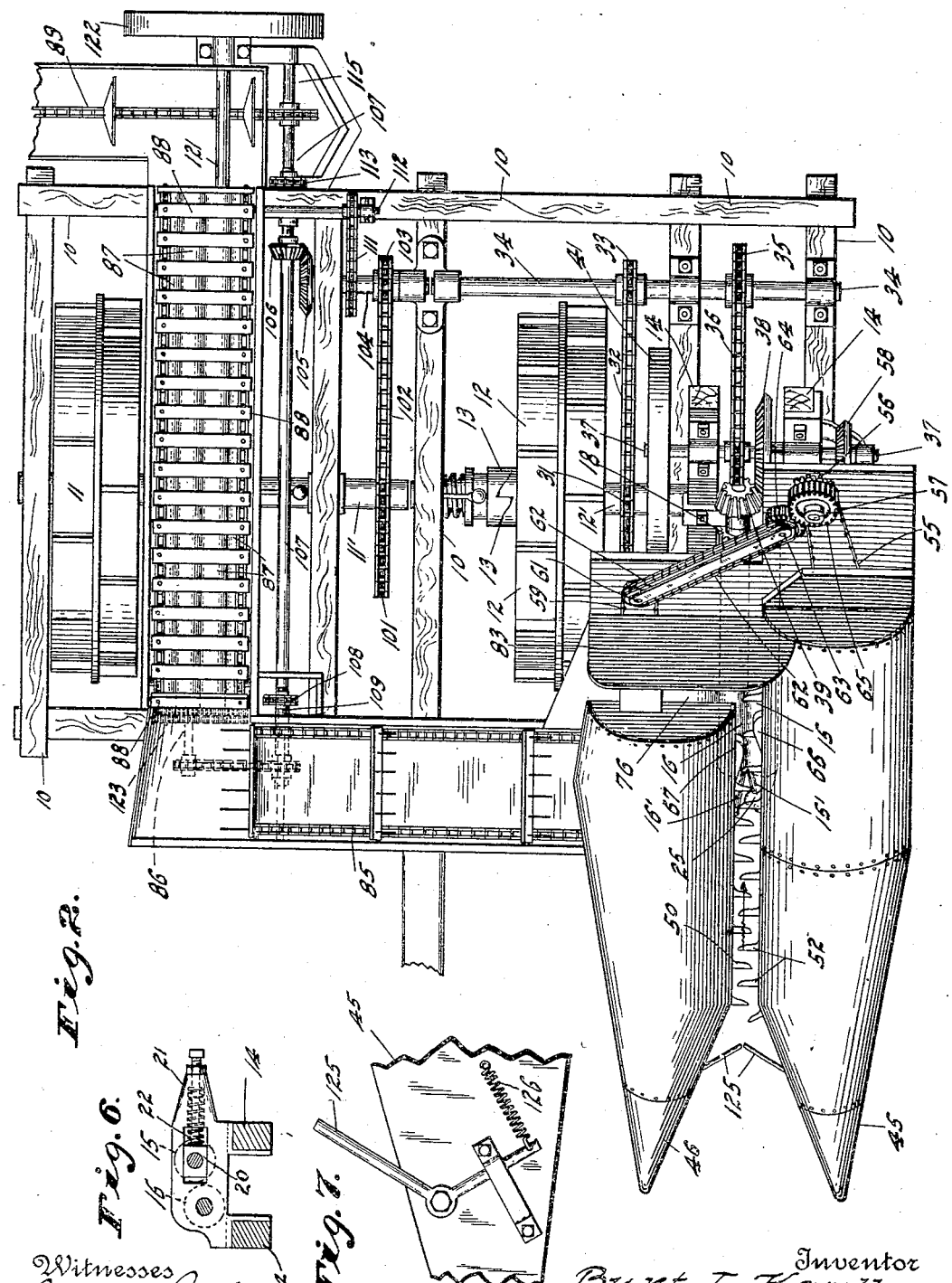

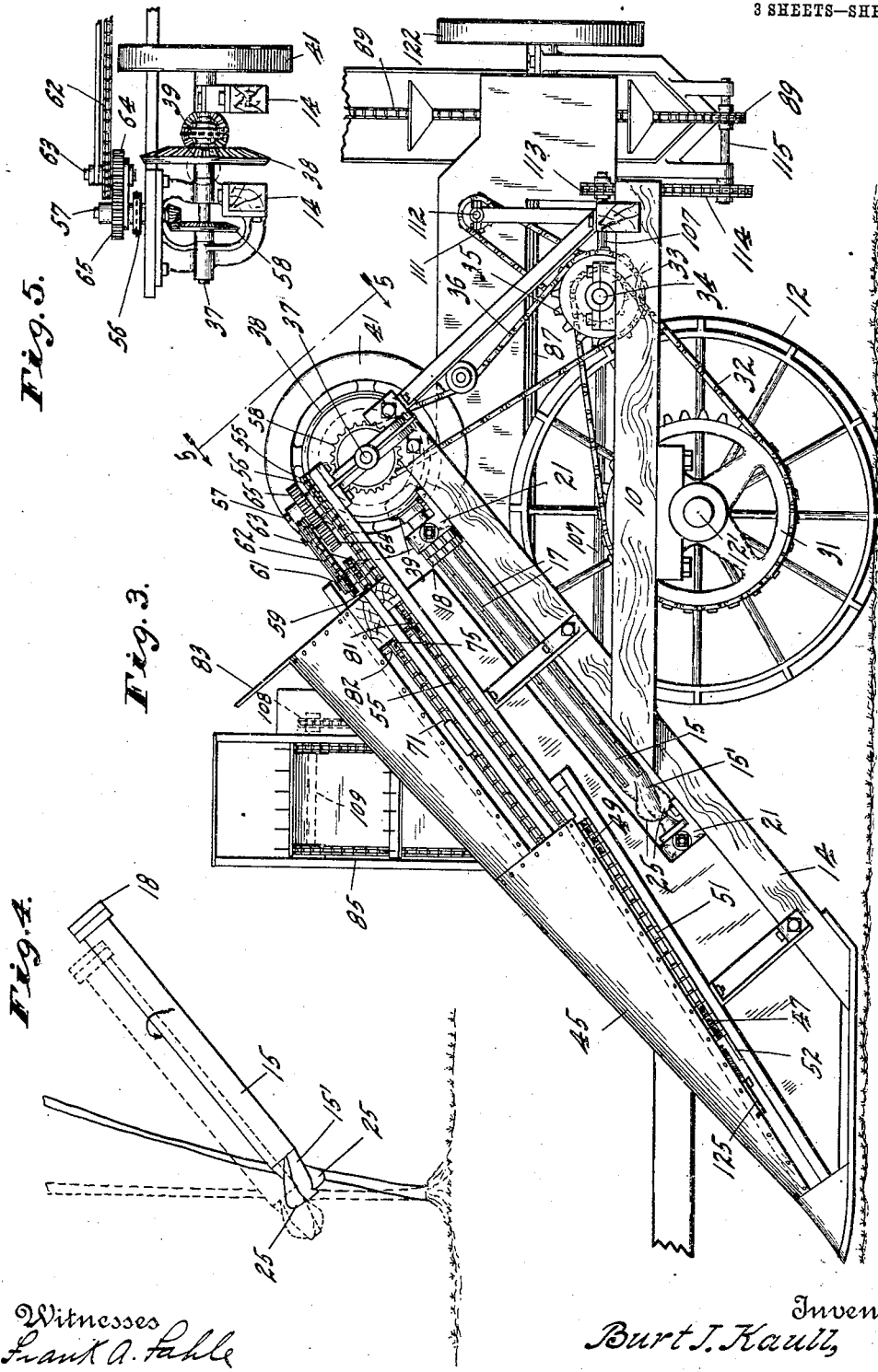

UNITED STATES PATENT OFFICE.

BURT J. KAULL, OF LA FAYETTE, INDIANA, ASSIGNOR TO INDIANA PICKER & HUSKER COMPANY, OF LA FAYETTE, INDIANA, A CORPORATION OF INDIANA.

CORN-PICKER.

958,649.  Specification of Letters Patent.   Patented May 17, 1910.

Application filed June 1, 1909. Serial No. 499,436.

*To all whom it may concern:*

Be it known that I, BURT J. KAULL, a citizen of the United States, residing at La Fayette, in the county of Tippecanoe and State of Indiana, have invented certain new and useful Improvements in Corn-Pickers, of which the following is a specification.

The object of my invention is to produce a machine capable, when driven along a standing row of corn, to strip the ears from the stalks, allowing said stalks to remain standing; remove the husks from the corn, and deliver the husked corn into a wagon driven alongside of and with my improved machine.

Heretofore, in machines of this type, difficulty has been experienced by reason of the fact that, so soon as the standing stalk was engaged by the machine, for the purpose of stripping the ears from the stalk, the advance of the machine along the ground would result in pulling the corn stalk out of the ground, whereupon it was likely to become clogged in the machine and either choke it or require such a great amount of power as to render it impossible for an ordinary team of horses to draw the same.

The particular object of my invention is, therefore, to produce a mechanism of such character that a standing stalk will be delivered to the stripping rolls under such conditions that the immediately subsequent advance of the machine over the ground will not operate as an upward pull upon the stalk to uproot it.

The accompanying drawings illustrate my invention.

Figure 1 is a front elevation of the principal portion of my machine, one of the protecting hoods being omitted in order to show the feeding chains; Fig. 2 is a plan of the entire machine excepting the delivery end of the carrier which delivers the shucked ears; Fig. 3 a side elevation from the stripper-roll side; Fig. 4 a diagram illustrating the manner in which the standing stalk is delivered to the stripping rolls; Fig. 5 a view on line 5—5 of Fig. 3; Fig. 6 a detail of one of the bearings of one stripper roll, and Fig. 7 a detail of one of the ear-floating fingers.

In the drawings, 10 indicates the main frame of the machine which may be conveniently made of fitted timbers forming a rectangular frame. Frame 10 is supported upon two ordinary bull-wheels 11 and 12 which are carried respectively upon separate, although alined, shafts 11' and 12', each bull-wheel being connectible with or disconnectible from its shaft by any suitable clutch mechanism, as indicated at 13. At one forward corner of frame 10 I mount a rearwardly inclined supplemental frame 14 upon which are journaled two snapping rolls 15 and 16 which are provided, as is usual in this type of machine, with longitudinal ribs 17 which roll together, somewhat after the manner of gear teeth, as the stripper rolls are rotated. Said stripper rolls are geared together at their rear upper ends by means of gears 18—18 which have teeth of sufficient length to permit a reasonable lateral separation of one roll from the other. In order to permit such lateral movement the roll 15 is supported at its opposite ends in bearings 20 which, in turn, are supported in brackets 21, springs 22 being provided to engage the bearings and urge the roller 15 bodily toward roller 16.

In order to permit the entrance of a standing stalk between the rollers 15 and 16, said rollers are tapered at 15' and 16' for a comparatively short distance of their length, thus forming an open V-shaped throat which is carried onto the standing stalk. I have found by experience that, in attempting to crowd two stripping rollers provided with this V-shaped throat alone onto a standing stalk, the stalk will be bent forward from its roots before it is firmly grasped between the two rollers and started downward. As a consequence the advancement of the machine along the ground, immediately subsequent to the time when the stalk has been gripped by the stripper rolls, does not feed the stalk downward and rearward as rapidly as the machine is going forward and the stalk is therefore pulled up by the roots. In order to avoid this difficulty, I provide one of the tapered ends, say the end 15', with feeding wings 25 which have a radial dimension sufficient to bridge the throat between the tapered ends of the stripping rolls and I give these wings 25 an inclination to the axis of a little more than 45° so that their speed of delivery toward the rear is greater than their rotative speed. The stripper rolls are then geared so as to rotate at such speed, that, after having once gripped the standing stalk, the relative movement between the stalk and stripper rolls will correspond to the forward movement of the machine. As a consequence when the tips of the tapered ends of the stripper rolls are brought to a standing stalk that stalk will enter the throat between said tapered ends and will be quickly engaged by one of the wings 25 and by it immediately confined within the throat and be drawn quickly rearwardly at a speed greater than the speed of advancement of the machine so that, at the instant when the stalk reaches the initial gripping portion of the stripper rolls, it has been inclined rearwardly by the action of the wings 25 and, while the stripper rolls are getting a grip upon the stalk and pinching the stalk between them, the stalk will be straightened up, and perhaps inclined slightly forwardly. By this time, however, the stripper rolls have so engaged the stalk that, as the machine moves forward, the stripper rolls will roll relatively upwardly upon the stalk and there is no tendency to uproot the stalk. For this action it is essential, as repeated trials in the field have demonstrated, that the stalk be so confined in the throat at the entrance of the stripper rolls that the wings 25 will act thereon positively every time so as to give each stalk the initial rearward inclination before it enters between the stripper rolls.

The stripper rolls may be driven by any suitable train of gearing from bull-wheel 12. I find a convenient train to be as follows:— Secured to shaft 12' is a sprocket wheel 31 connected by a chain 32 with a sprocket wheel 33 carried by a jack shaft 34. Secured to shaft 34 is a sprocket wheel 35 which is connected by a chain 36 with a jack shaft 37 provided with a bevel gear 38 meshing with a bevel pinion 39 secured to the upper end of roller 16. In order to cause the stripper rolls to act with greater uniformity upon the stalks I find it desirable to provide the jack shaft 37 with a fly wheel 41.

While the structure thus far described is the primary and fundamental feature of my machine yet I find in practice that means need be provided to straighten the stalks as much as possible in order that they may stand properly at the time they are engaged by the wings 25. It is necessary, however, that at the exact time of engagement of the stalks by the snapping rolls, the upper ends of the stalks should be free. I therefore provide the supplemental frame 14 with forwardly and downwardly extending guide horns 45 and 46, which at their lower ends, run upon, or very close to, the ground. On horn 45 I mount a series of sprocket wheels 47, 48 and 49 over which runs an endless chain 51 provided with projecting fingers 52, a guard 53 being arranged over chain 51 along the inner face or edge of horn 45. The feed chain 51 is moved in the direction indicated by the arrow by means of a driving sprocket 54 over which runs a drive chain 55 which extends upwardly and rearwardly to a driving wheel 56 carried by shaft 57 which, at its lower end, carries a pinion meshing with a gear 58 carried by jack shaft 37. The opposite horn 46 carries a similar feed chain comprising fingers 50, which are so timed relative to fingers 52 that they will interdigitate therewith, as clearly shown in Figs. 1 and 2. The details of the mounting of said feed-chain are not thought to be necessary as they are substantially the same as those of chain 51. The chain which carries fingers 50 is driven by means of a sprocket chain 59 running from a shaft 61 which, in turn, is driven by a chain 62 running over a sprocket wheel carried by a shaft 63 which shaft carries a gear 64 meshing with a gear 65 carried by shaft 57. Fingers 52 and 50 are withdrawn from the line of stalks just at the point where wings 25 take hold of the stalks and, in order to properly strip the stalks from the fingers I provide a block 66 (Fig. 1) which pushes the stalks laterally in one direction while the fingers 52 are withdrawn in the opposite direction by passing around wheel 48, and I also provide a similar block 67 which coöperates similarly with fingers 50. The fingers 52 and 50 travel rearwardly at a speed only very slightly greater than the forward speed of the machine, bent stalks being thus straightened up by these chains and delivered to the wings 25.

In order, however, to cause the machine to rapidly clear itself from the upper ends of the stalks, especially where the corn is high and the upper ends stand very materially higher than the machine, it is desirable, immediately after the stalks have been engaged by and firmly pinched between the stripper rolls, that means be provided to suddenly bend the upper ends of the stalks backward and for this reason I mount, upon the upper end of horn 45, an endless chain 71 provided with fingers 72. The chain 71 runs around sprockets 73, 74 and 75, as clearly shown in Fig. 1 engaging the upper ends of the stalks opposite a receiving chute or trough 76 which is formed alongside of the stripper roll 16. Chain 71 is driven at such speed that fingers 72 will move upwardly and rearwardly at sufficient speed to bend the stalks downwardly and rearwardly and this driving is accomplished by means of chain 55 which, at a point intermediate in its length, passes over a sprocket wheel 81 carried by the shaft 82, which carries sprocket wheel 75.

The interaction of the stripper rolls 15 and 16 upon the stalk, snaps the ears from the stalk in a well known manner and said ears drop into the trough 76 which, at its upper end is guarded by a high guard board 83 which prevents the detached ears from passing back into the gearing.

In order that the ears may be discharged from the snapping rollers when they have been broken from the stalks, I have found it advisable to set the outer roll 15 a little higher than the inner roll 16, as clearly indicated in Fig. 6, so that the separated ears have a general tendency downward over roll 16 and away from the crotch between the rolls 15 and 16.

The detached ears slide downwardly and forwardly in trough 76 and are delivered to an endless carrier and elevator 85 which discharges into a chute 86 which delivers to husking rollers 87 of any desired form lying beneath an endless belt or carrier 88 which serves to keep the ears down in the throat of the husking rolls and to drive the husked ears rearwardly and discharge the same into an elevator 89 mounted at the rear end of the husking rolls and adapted to deliver the husked ears to a wagon in an ordinary manner.

I have found it desirable, in actual practice, that the snapping mechanism be driven independently of the husking and elevating mechanism and consequently the husking and elevating mechanism is driven from the shaft 11′ by means of the following train of gearing. Secured to shaft 11′ is a sprocket wheel 101 over which a chain 102 runs to sprocket wheel 103 carried by a jack shaft 104. Shaft 104 carries a gear 105 which meshes with a gear 106 carried by a longitudinal jack shaft 107 which is connected by a chain 108 with a short shaft 109 over which the elevator 85 runs and by means of which it is driven. Shaft 104 also carries a sprocket wheel over which runs a sprocket chain 111 to a sprocket wheel carried by a shaft 112 over which the carrier 88 runs and by means of which it is driven. Shaft 107 carries a sprocket wheel 113 over which a chain 114 runs to a shaft 115 which drives the elevator chain 89. In order to prevent sudden jerks in the operation of the husking and delivering mechanism I provide a longitudinal shaft 121 which, at its rear end carries a fly wheel 122 and at its front end is connected by a suitable driving train 123 (see dotted lines Fig. 2), with jack shaft 107.

The machine is well balanced and a good team of horses is able to operatively carry the same through a corn field at a brisk walk.

In every field of standing corn there are numbers of stalks which are short or have either been bent or broken down until the ears lie close to the ground and, in order to be sure to get these ears above the fingers 50 and 52, I mount in each horn 45 and 46, in front of the most forward portions of the carriers of fingers 50 and 52, some ear-floating spring fingers 125 which extend toward each other and either overlap or substantially meet, said fingers being yieldingly held in their extended position by any suitable means, such as spring 126, said springs being strong enough to hold up against the weight of an ear of corn but yielding to the passage of stalks. As the machine advances the fingers 125 pass beneath any ears which may be low down and the ears float upon these spring fingers until the fingers 50 and 52 are reached, these last mentioned fingers serving to support the ear and prevent any ears from getting down into the receiving throat of the snapping rolls.

It will be readily apparent that more than one pair of these spring fingers 125 may be provided although, in practice I have found that a single pair is sufficiently effective in most conditions of the crop.

I claim as my invention:—

1. In a corn picker, a pair of rearwardly and upwardly inclined snapping rolls having tapered lower ends and a feeding wing carried by one of said ends and bridging the throat between said end and the companion end and having an axial inclination sufficient to draw a corn stalk rearwardly at a speed greater than the forward speed of the machine, whereby a standing stalk is inclined rearwardly at the time of engagement between the stripping rolls.

2. In a corn picker, the combination, of a pair of upwardly and rearwardly inclined snapping rolls, of feeding means arranged in advance of the receiving throat of said snapping rolls and extending rearwardly to but not beyond said receiving throat, means for driving said feeding means rearwardly during advancement of the machine, a second feeding means arranged above the feeding rolls and beginning at a point adjacent the receiving throat of the snapping rolls but beyond the end of the first feeding means and extending rearwardly therefrom, and means for driving said second feeding means.

3. In a corn picker, the combination with upwardly and rearwardly inclined snapping rolls, of a pair of laterally separated guides extending downwardly and forwardly in front of and over said snapping rolls, and a pair of ear-floating yielding members carried by said guides near their forward ends and projecting toward each other, for the purpose set forth.

In witness whereof, I, have hereunto set my hand and seal at La Fayette, Indiana, this 4th day of May, A. D. one thousand nine hundred and nine.

BURT J. KAULL. [L. S.]

Witnesses:
ADAM WALLACE,
A. ORTH BEHM.